US011162572B2

(12) United States Patent
Poster

(10) Patent No.: US 11,162,572 B2
(45) Date of Patent: Nov. 2, 2021

(54) CONVECTIVE COOLING OF A PRESSURIZED GEARBOX

(71) Applicant: Bell Helicopter Textron Inc., Fort Worth, TX (US)

(72) Inventor: Scott David Poster, Arlington, TX (US)

(73) Assignee: TEXTRON INNOVATIONS INC., Providence, RI (US)

( * ) Notice: Subject to any disclaimer, the term of this patent is extended or adjusted under 35 U.S.C. 154(b) by 49 days.

(21) Appl. No.: 15/354,715

(22) Filed: Nov. 17, 2016

(65) Prior Publication Data

US 2018/0087648 A1 Mar. 29, 2018

Related U.S. Application Data

(60) Provisional application No. 62/399,097, filed on Sep. 23, 2016, provisional application No. 62/423,371, filed on Nov. 17, 2016.

(51) Int. Cl.
*B64C 27/04* (2006.01)
*F16H 57/04* (2010.01)
(Continued)

(52) U.S. Cl.
CPC ......... *F16H 57/0416* (2013.01); *B64C 27/12* (2013.01); *B64C 27/82* (2013.01); *F16H 57/02* (2013.01); *F16H 57/045* (2013.01); *F16H 57/0417* (2013.01); *F16H 57/0436* (2013.01); *F16H 57/0404* (2013.01); *F16H 57/0435* (2013.01); *F16H 2057/02039* (2013.01)

(58) Field of Classification Search
CPC ................................................ F16H 57/0412
See application file for complete search history.

(56) References Cited

U.S. PATENT DOCUMENTS 4,473,754 A * 9/1984 Joy ........................... F02C 1/04
290/43
4,678,070 A * 7/1987 Light ....................... F01P 1/06
192/113.21
(Continued)

FOREIGN PATENT DOCUMENTS

CA 2828643 A1 4/2014
CA 2833050 A1 5/2014
(Continued)

OTHER PUBLICATIONS

"Synthetic oil," Wikipedia Page, dated by Wayback Machine to Jan. 10, 2015, url: <https://web.archive.org/web/20150110052739/https://en.wikipedia.org/wiki/Synthetic_oil>.*
(Continued)

*Primary Examiner* — Richard W Ridley
*Assistant Examiner* — Brian J McGovern
(74) *Attorney, Agent, or Firm* — Edwin S. Flores; Daniel J. Chalker; Chalker Flores, LLP

(57) ABSTRACT

The present invention includes a cooling system for a gearbox, the cooling system comprising: a pressurized housing in fluid communication with the gearbox configured to circulate a pressurized lubricant; and one or more cooling fins about the pressurized housing, wherein heat from the pressurized lubricant within the pressurized housing is actively convected through the one or more cooling fins.

6 Claims, 4 Drawing Sheets

(51) Int. Cl.
*B64C 27/82* (2006.01)
*B64C 27/12* (2006.01)
*F16H 57/02* (2012.01)

(56) References Cited

U.S. PATENT DOCUMENTS

| | | | | |
|---|---|---|---|---|
| 6,422,786 | B1* | 7/2002 | Grant | F16H 57/0412 |
| | | | | 180/68.1 |
| 8,535,199 | B2* | 9/2013 | Lohr | F16H 15/52 |
| | | | | 476/38 |
| 8,905,193 | B2* | 12/2014 | Sinusas | B64C 27/12 |
| | | | | 184/27.1 |
| 8,985,517 | B2 | 3/2015 | Ehringer et al. | |
| 9,272,777 | B2 | 3/2016 | McGlaun et al. | |
| 9,458,923 | B2 | 10/2016 | Poster et al. | |
| 2003/0067228 | A1* | 4/2003 | Vanjani | H02K 5/18 |
| | | | | 310/64 |
| 2009/0032321 | A1* | 2/2009 | Marsh | B60G 3/00 |
| | | | | 180/65.51 |
| 2012/0067671 | A1* | 3/2012 | Sammataro | F16N 29/04 |
| | | | | 184/6.4 |
| 2014/0070600 | A1* | 3/2014 | Park | H02K 5/18 |
| | | | | 301/6.5 |
| 2015/0224868 | A1* | 8/2015 | Makino | B60L 15/20 |
| | | | | 301/6.5 |
| 2016/0311527 | A1* | 10/2016 | Poster | B64C 27/12 |

FOREIGN PATENT DOCUMENTS

| | | |
|---|---|---|
| DE | 102009037548 A1 | 4/2011 |
| EP | 0785379 A2 | 7/1997 |
| EP | 1275884 A2 | 1/2003 |
| EP | 2505878 A1 | 10/2012 |
| EP | 2725262 A1 | 4/2014 |
| EP | 2733069 A1 | 5/2014 |
| EP | 3299671 A1 | 3/2018 |
| WO | 2009148461 A1 | 12/2009 |

OTHER PUBLICATIONS

European Patent Office, Communication pursuant to Article 94(3) EPC for EP Appl. No. 17190421.2 dated Mar. 12, 2018, 7 pp.
European Patent Office, Communication pursuant to Article 94(3) EPC for EP Appl. No. 17190421.2 dated Sep. 4, 2018, 5 pp.
European Patent Office, European Search Report for EP Appl. No. 17192701.5 dated Feb. 14, 2018, 4 pp.
European Patent Office, Communication pursuant to Article 94(3) EPC for EP Appl. No. 17190421.2 dated Jul. 5, 2019, 5 pp.
European Patent Office,Communication pursuant to Article 94(3) EPC for EP Appl. No. 17190421.2 dated Dec. 11, 2020, 7 pp.
European Patent Office,Communication pursuant to Article 94(3) EPC for EP Appl. No. 17190421.2 dated Jul. 7, 2020, 5 pp.

* cited by examiner

CONVECTIVE COOLING OF A PRESSURIZED GEARBOX

CROSS-REFERENCE TO RELATED APPLICATIONS

This application claims the benefit of provisional U.S. Patent Application Ser. No. 62/399,097, which was filed in the U.S. Patent and Trademark Office on Sep. 23, 2016, and of provisional U.S. Patent Application Ser. No. 62/423,371, which was filed in the U.S. Patent and Trademark Office on Nov. 17, 2016, the entire content of which are hereby expressly incorporated by reference.

STATEMENT OF FEDERALLY FUNDED RESEARCH

This application is not the subject of any federally sponsored research or development.

TECHNICAL FIELD OF THE INVENTION

The present invention relates in general to the field of device cooling, and more particularly, to an apparatus and method for convective cooling of a pressurized gearbox.

BACKGROUND OF THE INVENTION

Without limiting the scope of the invention, its background is described in connection with lubrication systems.

One such invention is taught in U.S. Pat. No. 9,458,923, issued to Poster, et al., entitled "Gearbox with passive lubrication system." These inventors teach a lubrication system that includes a reserve housing configured to retain a lubrication fluid. A supply line in fluid communication with the reserve housing is configured to provide pressurized lubrication fluid to the reserve housing. An overflow tube has an overflow port, the overflow tube being configured to prevent the volume of the lubrication fluid from exceeding a certain amount. A metering jet is configured to allow the lubrication fluid to flow from the reserve housing onto a component, such as a bearing, in the gearbox at a predetermined rate. The metering jet provides flow of the lubrication fluid onto the bearing even when the supply line no longer provides pressurized lubrication fluid to the reserve housing.

SUMMARY OF THE INVENTION

In one embodiment, the present invention includes a cooling system for a gearbox, the cooling system comprising: a pressurized housing in fluid communication with the gearbox configured to circulate a pressurized lubricant; and one or more cooling fins about the pressurized housing, wherein heat from the pressurized lubricant within the pressurized housing is actively convected through the one or more cooling fins. In one aspect, the cooling fins are metal, composite, ceramic, polymer, or combinations thereof. In another aspect, the cooling fins are disposed over a majority of an exterior surface of the pressurized housing to passively cool the pressurized lubricant. In another aspect, the gearbox is connected to an engine in a car, truck, locomotive, aircraft, or rotorcraft. In another aspect, the gearbox is a main rotor gearbox, an intermediate gearbox, or a tail rotor gearbox of a rotorcraft. In another aspect, the pressurized lubricant is a petroleum lubricant, a mineral oil, a plant oil, a synthetic lubricant, a high temperature lubricant, or combinations thereof. In another aspect, the gearbox further comprises at least one of: a filter, a pump, a bearing, or one or more valves for the pressurized lubricant. In another aspect, a length and a width of the cooling fins are modified to optimize the amount of heat convected by the cooling fins. In another aspect, the cooling system further comprises an active cooling system for the pressurized lubricant. In another aspect, the gearbox is at least partially lubricated by the pressurized lubricant.

In another embodiment, the present invention includes a gearbox for an aircraft, the gearbox comprising: a housing that encloses a plurality of gearbox components, wherein the gearbox components are at least partially lubricated by a pressurized lubricant; a pump that pressurizes and circulates the pressurized lubricant; a pressurized passage in fluid communication with the housing configured to circulate the pressurized lubricant about the gearbox components; and one or more cooling fins about the pressurized passage, wherein heat from the pressurized lubricant circulated within the pressurized passage is actively convected through the one or more cooling fins. In one aspect, the cooling fins are metal, composite, ceramic, polymer, or combinations thereof. In another aspect, the cooling fins are disposed over a majority of an exterior surface of the pressurized passage to passively cool the pressurized lubricant. In another aspect, the gearbox is connected to an engine in a car, truck, locomotive, aircraft, or rotorcraft. In another aspect, the gearbox is a main rotor gearbox, an intermediate gearbox, or a tail rotor gearbox of a rotorcraft. In another aspect, the pressurized lubricant is a petroleum lubricant, a mineral oil, a plant oil, a synthetic lubricant, a high temperature lubricant, or combinations thereof. In another aspect, the gearbox further comprises at least one of: a filter, a pump, a bearing, or one or more valves for the pressurized lubricant. In another aspect, a length and a width of the cooling fins are modified to optimize the amount of heat convected by the cooling fins. In another aspect, the gearbox further comprises an active cooling system for the pressurized lubricant.

In another embodiment, the present invention includes a method for cooling a gearbox that is at least partially lubricated by a pressurized lubricant, the method comprising: providing a pressurized housing in fluid communication with the gearbox configured to circulate the pressurized lubricant; and positioning one or more cooling fins about the pressurized housing, wherein heat from the pressurized lubricant within the pressurized housing is actively convected through the one or more cooling fins.

Yet another embodiment of the present invention includes a kit for a cooling system for a gearbox, the kit comprising: a pressurized housing comprising one or more cooling fins about the pressurized housing, wherein the pressurized housing is configured to attach to the gearbox, wherein the gearbox is at least partially lubricated by a pressurized lubricant, wherein heat from the pressurized lubricant within the pressurized housing is actively convected through the one or more cooling fins; and instructions for removing a pressurized housing without fins and replacing it with the pressurized housing having cooling fins.

BRIEF DESCRIPTION OF THE DRAWINGS

For a more complete understanding of the features and advantages of the present invention, reference is now made to the detailed description of the invention along with the accompanying figures and in which.

DETAILED DESCRIPTION OF THE INVENTION

Illustrative embodiments of the system of the present application are described below. In the interest of clarity, not all features of an actual implementation are described in this specification. It will of course be appreciated that in the development of any such actual embodiment, numerous implementation-specific decisions must be made to achieve the developer's specific goals, such as compliance with system-related and business-related constraints, which will vary from one implementation to another. Moreover, it will be appreciated that such a development effort might be complex and time-consuming but would nevertheless be a routine undertaking for those of ordinary skill in the art having the benefit of this disclosure.

In the specification, reference may be made to the spatial relationships between various components and to the spatial orientation of various aspects of components as the devices are depicted in the attached drawings. However, as will be recognized by those skilled in the art after a complete reading of the present application, the devices, members, apparatuses, etc. described herein may be positioned in any desired orientation. Thus, the use of terms such as "above," "below," "upper," "lower," or other like terms to describe a spatial relationship between various components or to describe the spatial orientation of aspects of such components should be understood to describe a relative relationship between the components or a spatial orientation of aspects of such components, respectively, as the device described herein may be oriented in any desired direction.

This invention is generally in the field of drive systems, and relates specifically to pressurized gearboxes that are cooled through convection to the surrounding environment. In the past, gearboxes utilized fins located on the sump area of the gearbox housing where the stagnant oil sits during its dwell time or along unpressurized walls of the housing to reject the bulk heat of the gearbox.

Figure 1:
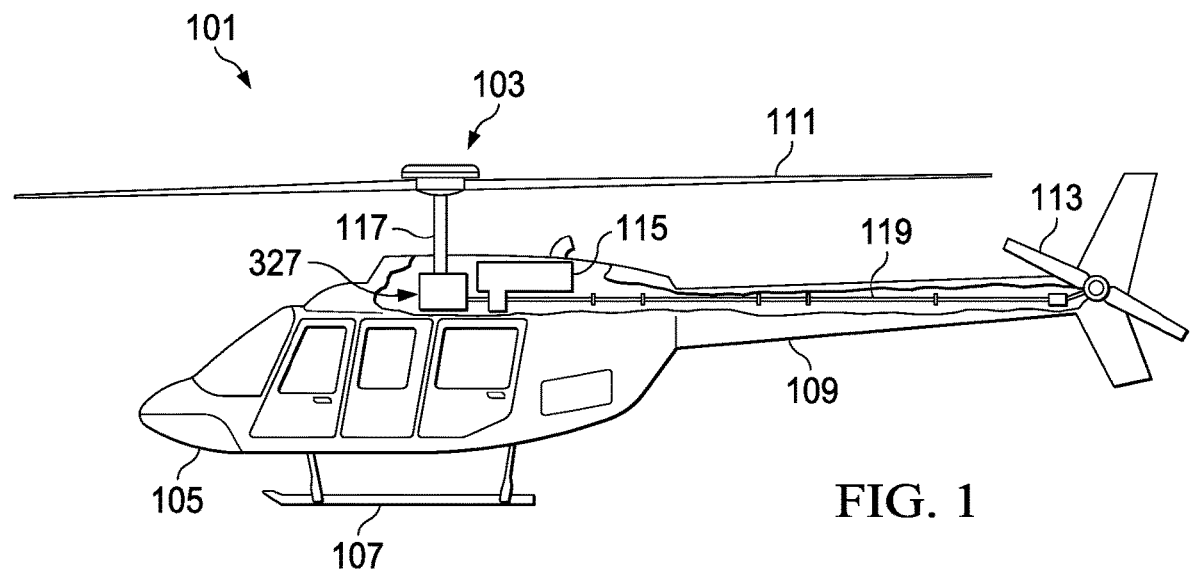
FIG. 1 is a schematic side view of a rotorcraft, according to an illustrative embodiment of the present application.
Figure 2:
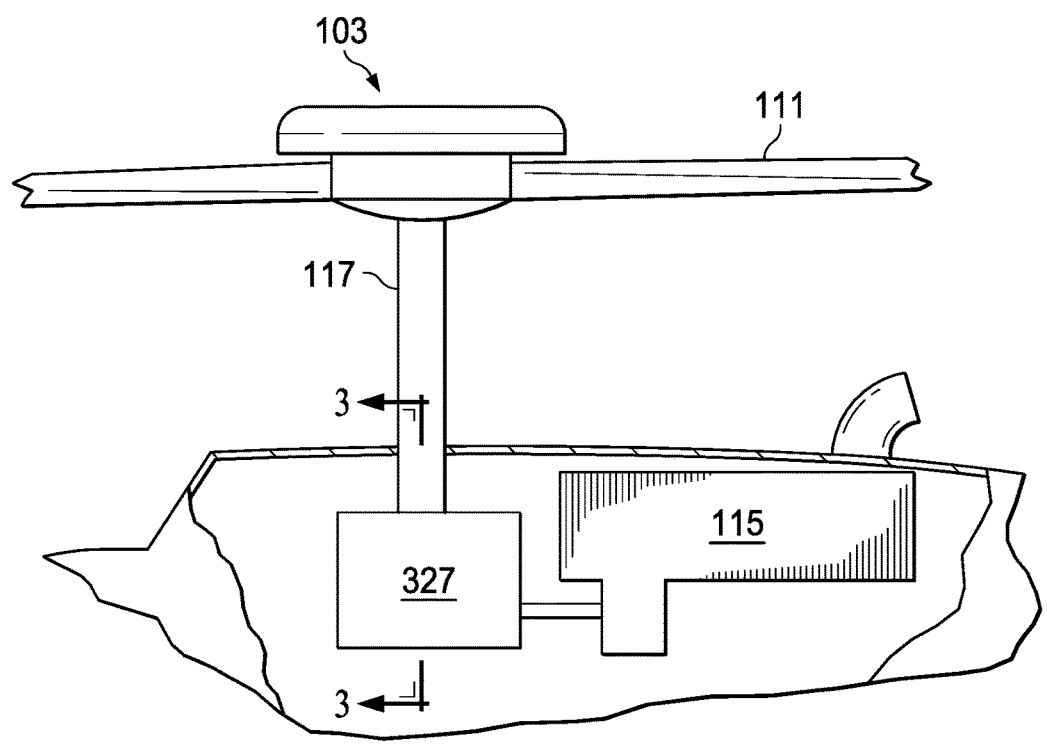
FIG. 2 is a partial schematic side view of the rotorcraft of FIG. 1, according to an illustrative embodiment of the present application.

Referring to FIGS. 1 and 2 in the drawings, a rotorcraft 101 is illustrated. Rotorcraft 101 has a rotor system 103 with a plurality of main rotor blades 111. Rotorcraft 101 further includes a fuselage 105, landing gear 107, a tail member 109, and tail rotor blades 113. An engine 115 supplies torque to a main rotor mast 117 via a gearbox 327 for the rotating of main rotor blades 111. Engine 115 also supplies torque to a tail rotor drive shaft 119 for the rotating of tail rotor blades 113. The pitch of each main rotor blade 111 can be selectively controlled in order to selectively control direction, thrust, and lift of rotorcraft 101. Further, the pitch of tail rotor blades 113 can be selectively controlled in order to selectively control yaw of rotorcraft 101. Rotorcraft 101 is illustrated for exemplary purposes only. It should be appreciated that the system of the present application may be used on aircraft other than rotorcraft, such as airplanes, tilt rotors, unmanned aircraft, to name a few examples. Further, the system of the present application may be used on non-aircraft vehicles and implementations, for example, cars, trucks, locomotives, boats, spacecraft, or combinations thereof.

This invention places addition surface area in the form of fins directly over a pressurized oil circuit within, attached to, and/or in fluid communication with the gearbox to take advantage of the addition heat rejection due to the pressurized oil flow carrying heated oil directly under the fins to aid in the convection of heat from the gearbox to the surrounding environment.

Pressurized oil within the gearbox is circulated through pressurized passages, cores, or annuli within the gearbox system to lubricate and cool the dynamic components. Increasing the surface area of the gearbox housing with the addition of fins has been the common practice for cooling the gearbox through convection to the surrounding environment. These fins are usually located on the sump area of the gearbox housing where the stagnant oil sits during its dwell time. This invention adds cooling fins directly over pressurized circuits on the gearbox housings to take advantage of the oil movement to carry heat to the housing and fins.

Figure 3A:
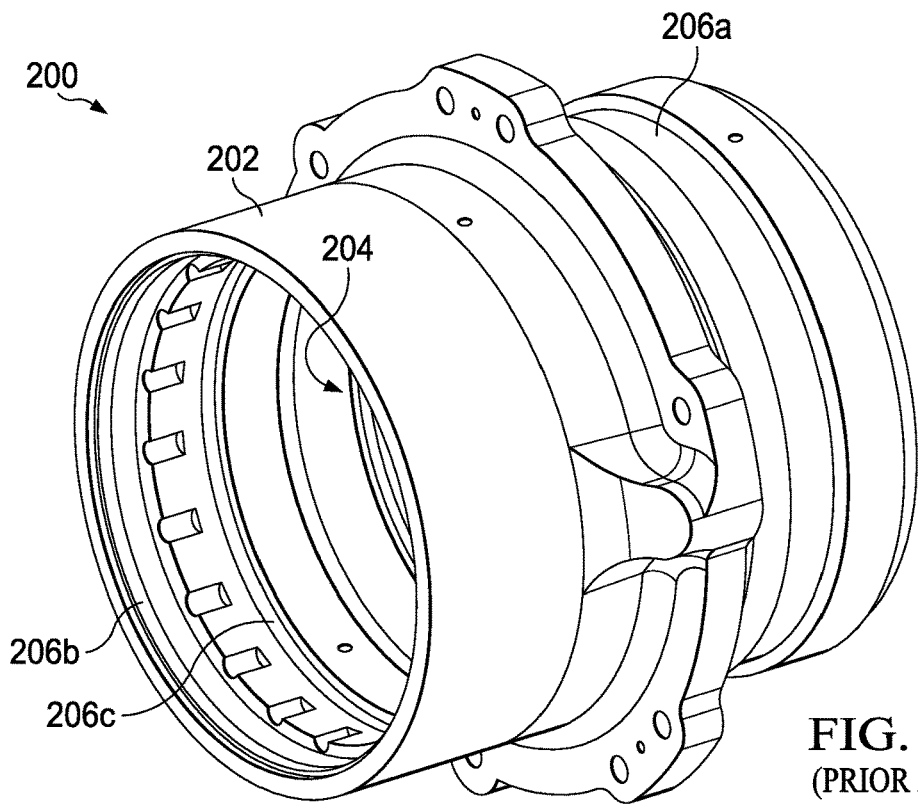
FIG. 3A is an isometric view of an oil annulus for pressurized lubricant flow of the prior art.

FIG. 3A is an isometric view of a housing 200 of the prior art that can be attached to a gearbox (not depicted) in the form of an annulus that is adapted to contain a pressurized lubricant. Housing 200 includes exterior surface 202, an opening 204, and one or more grooves 206a, 206b, 206c that are used to insert O-rings that are used to maintain the pressurized fluid within the annulus.

Figure 3B:
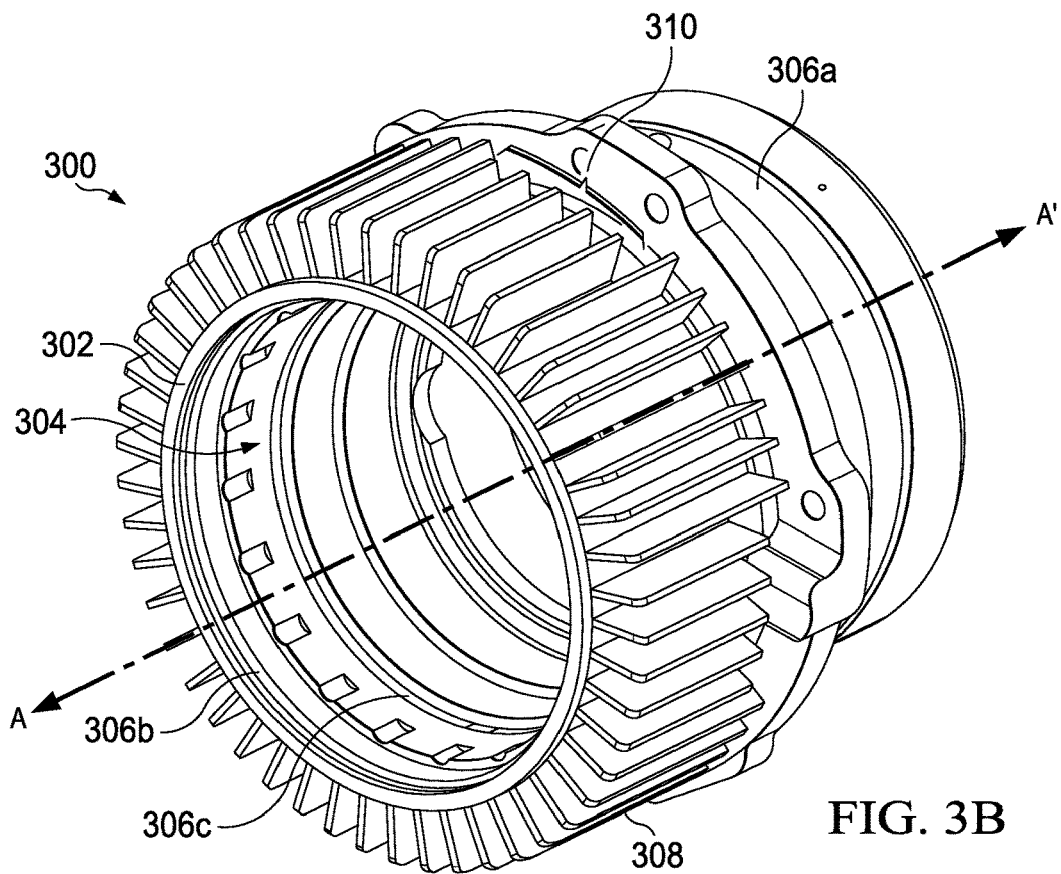
FIG. 3B is an isometric view of the present invention, in which a lubricant annulus for pressurized lubricant flow of the present invention further comprises a number of fins that directly convect the heat from the pressurized lubricant within the annulus.

FIG. 3B is an isometric view of a housing 300 of the present invention. In this embodiment, the housing 300 has an exterior surface 302, an opening or annulus 304, grooves 306a, 306b, 306c, but further includes, fins 308 that are attached to, or formed integral with, the housing 300 on the exterior surface 302. The fins 308 depicted can have varying lengths, thicknesses, and spacings, as shown at 310, which can be adapted to increase or decrease the convection of the pressurized lubricant or oil. Further, while the fins 308 in this embodiment are depicted as being generally parallel to the longitudinal axis (A-A') of the housing 300, the fins 308 can be in any orientation, such as rings around the exterior surface 302 and generally perpendicular to the longitudinal axis (A-A') of the housing 300, diagonal with respect to the longitudinal axis (A-A') of the housing 300, or any combinations thereof. The length and width of the fins 308 can also be adapted to provide for fasteners of the housing to the gearbox or to other components, such as filters, gears, valves, fluid lines, etc. (not depicted). The cooling fins may be made from one or more suitable materials, including metals, composites, ceramics, and/or polymers.

Figure 4:
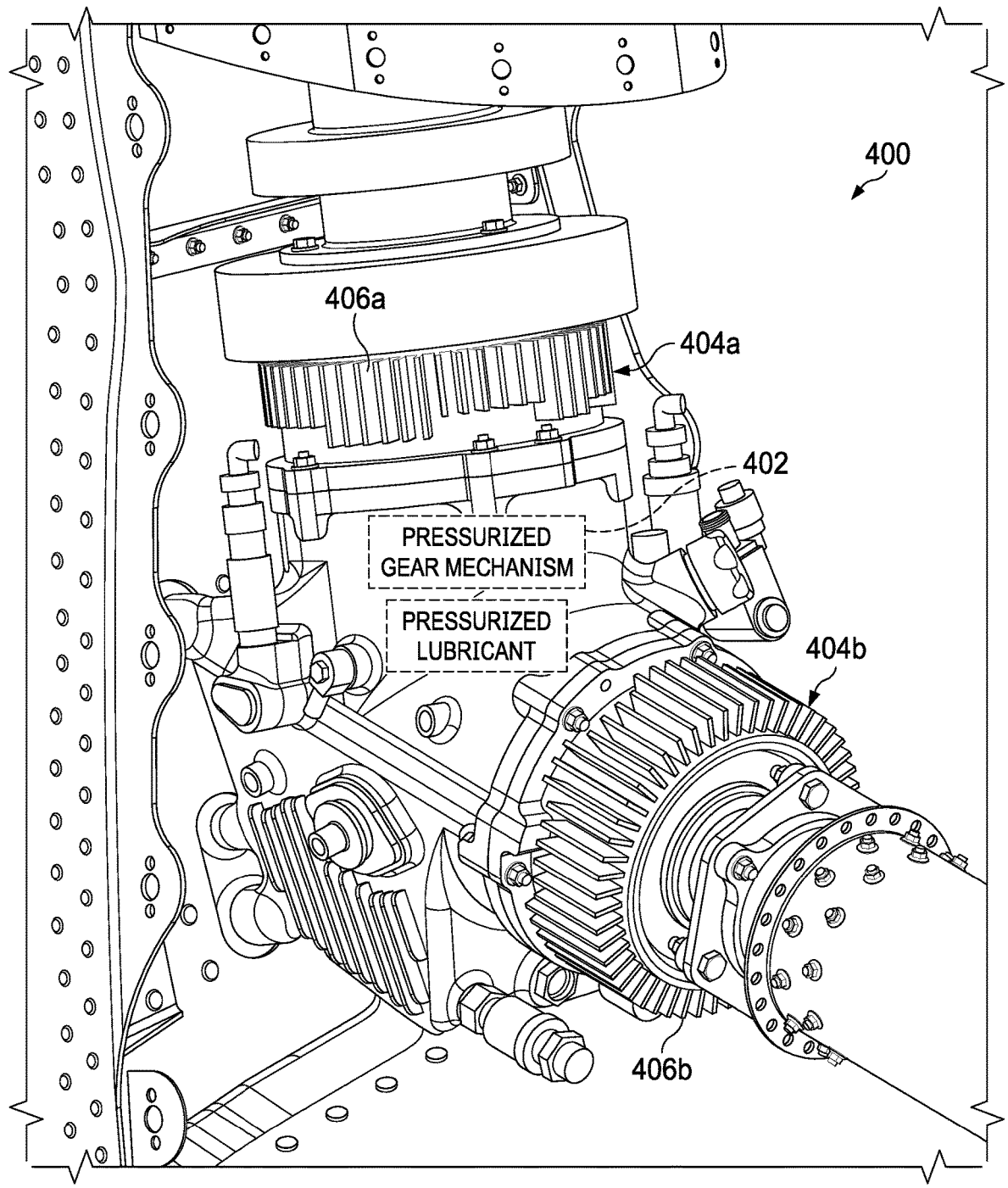
FIG. 4 is an isometric view of the present invention connected to a gear box at two separate locations to radiate heat from the pressurized lubricating fluid within the annulus.

FIG. 4 is an isometric view of one exemplary and non-limiting example of a pressurized gearbox 400 for a tail rotor of a rotorcraft. While a pressurized intermediate gearbox 400 is depicted, the present invention can be used with any pressurized gearbox. The pressurized gear mechanism 402, in this case is shown with a first and a second pressurized annuli 404a, 404b, shown with fins 406a, 406b, respectively. The first and a second pressurized annuli 404a, 404b, radiate heat from a pressurized lubricating fluid or oil within the first and second pressurized annuli 404a, 404b, to passively reduce the temperature of the pressurized lubricating fluid or oil in contact with the gearbox housing. The present invention can be used with any pressurized gearbox. Non-limiting examples of where a pressurized gearbox can be used includes the main engine to transmission gearbox, any gears used as couplers, the main rotor gearbox, the intermediate gearbox, or the tail rotor gearbox.

Figure 5:
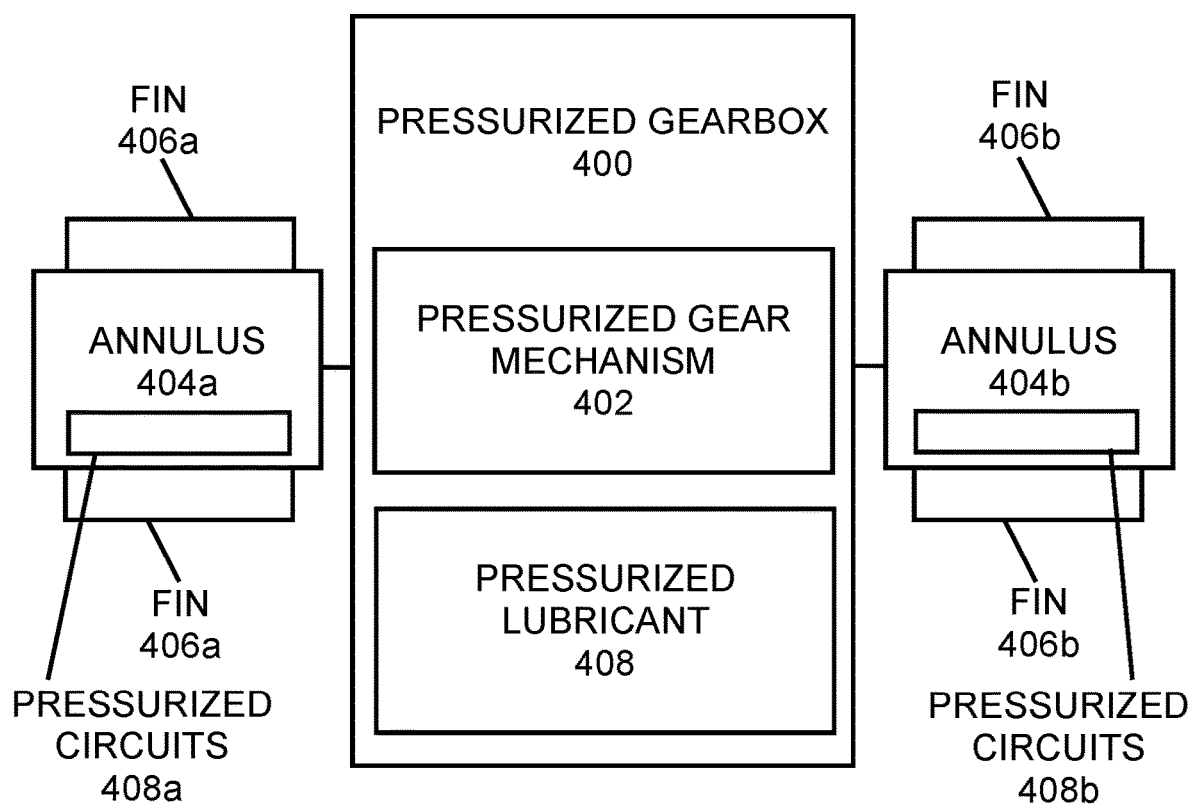
FIG. 5 is a schematic diagram of the present invention connected to a gearbox at two separate locations to radiate heat from the pressurized lubricating fluid within the annulus.

FIG. 5 is a schematic view of one exemplary and non-limiting example of the pressurized gearbox 400 for a tail rotor of a rotorcraft. While the pressurized intermediate gearbox 400 is depicted, the present invention can be used with any pressurized gearbox. The pressurized gear mechanism 402 in this case is shown with a first and a second pressurized annuli 404a, b, shown with fins 406a, b, respectively. The first and a second pressurized annuli 404a, b, radiate heat from a pressurized lubricating fluid or oil within the pressurized circuits 408a, b, within first and second pressurized annuli 404a, b, to passively reduce the temperature of the pressurized lubricating fluid or oil in contact with the gearbox housing. The present invention can be used with any pressurized gearbox. Non-limiting examples of where a pressurized gearbox can be used includes the main engine to transmission gearbox, any gears used as couplers, the main rotor gearbox, the intermediate gearbox, or the tail rotor gearbox.

It will be understood that particular embodiments described herein are shown by way of illustration and not as limitations of the invention. The principal features of this invention can be employed in various embodiments without departing from the scope of the invention. Those skilled in the art will recognize, or be able to ascertain using no more than routine experimentation, numerous equivalents to the specific procedures described herein. Such equivalents are considered to be within the scope of this invention and are covered by the claims.

All publications and patent applications mentioned in the specification are indicative of the level of skill of those skilled in the art to which this invention pertains. All publications and patent applications are herein incorporated by reference to the same extent as if each individual publication or patent application was specifically and individually indicated to be incorporated by reference.

The use of the word "a" or "an" when used in conjunction with the term "comprising" in the claims and/or the specification may mean "one," but it is also consistent with the meaning of "one or more," "at least one," and "one or more than one." The use of the term "or" in the claims is used to mean "and/or" unless explicitly indicated to refer to alternatives only or the alternatives are mutually exclusive, although the disclosure supports a definition that refers to only alternatives and "and/or." Throughout this application, the term "about" is used to indicate that a value includes the inherent variation of error for the device, the method being employed to determine the value, or the variation that exists among the study subjects.

As used in this specification and claim(s), the words "comprising" (and any form of comprising, such as "comprise" and "comprises"), "having" (and any form of having, such as "have" and "has"), "including" (and any form of including, such as "includes" and "include") or "containing" (and any form of containing, such as "contains" and "contain") are inclusive or open-ended and do not exclude additional, unrecited elements or method steps. In embodiments of any of the compositions and methods provided herein, "comprising" may be replaced with "consisting essentially of" or "consisting of". As used herein, the phrase "consisting essentially of" requires the specified integer(s) or steps as well as those that do not materially affect the character or function of the claimed invention. As used herein, the term "consisting" is used to indicate the presence of the recited integer (e.g., a feature, an element, a characteristic, a property, a method/process step or a limitation) or group of integers (e.g., feature(s), element(s), characteristic(s), propertie(s), method/process steps or limitation(s)) only.

The term "or combinations thereof" as used herein refers to all permutations and combinations of the listed items preceding the term. For example, "A, B, C, or combinations thereof" is intended to include at least one of: A, B, C, AB, AC, BC, or ABC, and if order is important in a particular context, also BA, CA, CB, CBA, BCA, ACB, BAC, or CAB. Continuing with this example, expressly included are combinations that contain repeats of one or more item or term, such as BB, AAA, AB, BBC, AAABCCCC, CBBAAA, CABABB, and so forth. The skilled artisan will understand that typically there is no limit on the number of items or terms in any combination, unless otherwise apparent from the context.

As used herein, words of approximation such as, without limitation, "about", "substantial" or "substantially" refers to a condition that when so modified is understood to not necessarily be absolute or perfect but would be considered close enough to those of ordinary skill in the art to warrant designating the condition as being present. The extent to which the description may vary will depend on how great a change can be instituted and still have one of ordinary skilled in the art recognize the modified feature as still having the required characteristics and capabilities of the unmodified feature. In general, but subject to the preceding discussion, a numerical value herein that is modified by a word of approximation such as "about" may vary from the stated value by at least ±1, 2, 3, 4, 5, 6, 7, 10, 12 or 15%.

All of the devices and/or methods disclosed and claimed herein can be made and executed without undue experimentation in light of the present disclosure. While the devices and/or and methods of this invention have been described in terms of preferred embodiments, it will be apparent to those of skill in the art that variations may be applied to the compositions and/or methods and in the steps or in the sequence of steps of the method described herein without departing from the concept, spirit and scope of the invention. All such similar substitutes and modifications apparent to those skilled in the art are deemed to be within the spirit, scope and concept of the invention as defined by the appended claims.

Furthermore, no limitations are intended to the details of construction or design herein shown, other than as described in the claims below. It is therefore evident that the particular embodiments disclosed above may be altered or modified and all such variations are considered within the scope and spirit of the disclosure. Accordingly, the protection sought herein is as set forth in the claims below.

To aid the Patent Office, and any readers of any patent issued on this application in interpreting the claims appended hereto, applicants wish to note that they do not intend any of the appended claims to invoke paragraph 6 of 35 U.S.C. § 112 as it exists on the date of filing hereof unless the words "means for" or "step for" are explicitly used in the particular claim.

What is claimed is:

1. A pressurized tailrotor gearbox comprising:
    a pressurized tailrotor gearbox housing;
    a gear mechanism in the pressurized tailrotor gearbox housing lubricated by a pressurized lubricant;

at least two pressurized annuli respectively located on opposite ends of the pressurized tailrotor gearbox housing, separated by the gear mechanism, wherein each of the at least two pressurized annuli comprises:

at least one respective groove formed on a respective interior circumferential surface of the respective pressurized annulus, each at least one respective groove configured to receive a respective O-ring;

a respective set of external cooling fins directly over the respective groove, the respective set of external cooling fins including:

a respective first subset of at least one fin having a respective first longitudinal length;

a respective second subset of at least one fin having a respective second longitudinal length;

a respective third subset of at least one fin having a respective third longitudinal length;

a respective fourth subset of at least one fin having a respective fourth longitudinal length;

wherein the respective first longitudinal length is different from the respective second and fourth longitudinal lengths;

wherein the respective second longitudinal length is different from the respective first and third longitudinal lengths;

wherein the respective first, second, third, and fourth subsets of at least one fin alternate about at least a respective portion of a respective circumference of the respective pressurized annulus;

wherein the respective sets of external cooling fins are configured to carry heat from the pressurized lubricant.

2. The pressurized tailrotor gearbox of claim 1, wherein the respective sets of external cooling fins are metal, composite, ceramic, polymer, or combinations thereof.

3. The pressurized tailrotor gearbox of claim 1, wherein the pressurized lubricant is a petroleum lubricant, a mineral oil, a plant oil, a synthetic lubricant, or combinations thereof.

4. The pressurized tailrotor gearbox of claim 1, wherein the dimensions of the respective sets of external cooling fins optimize an amount of heat convected by the external cooling fins.

5. The pressurized tailrotor gearbox of claim 1, wherein the pressurized tailrotor gearbox housing includes heat convecting cooling fins on an exterior surface thereof.

6. The pressurized tailrotor gearbox of claim 1, wherein each of the at least two pressurized annuli includes: a respective second groove formed on a respective exterior circumferential surface thereof.

\* \* \* \* \*